United States Patent
Fukasawa

(10) Patent No.: US 7,947,319 B2
(45) Date of Patent: May 24, 2011

(54) DOUGH COMPOSITIONS

(75) Inventor: Miyuki Fukasawa, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 887 days.

(21) Appl. No.: 11/052,113

(22) Filed: Feb. 8, 2005

(65) Prior Publication Data

US 2005/0175756 A1 Aug. 11, 2005

(30) Foreign Application Priority Data

Feb. 9, 2004 (JP) .................................. 2004-032233

(51) Int. Cl.
*A21D 10/00* (2006.01)
(52) U.S. Cl. ......................... 426/549; 426/496; 426/550
(58) Field of Classification Search .................. None
See application file for complete search history.

(56) References Cited

U.S. PATENT DOCUMENTS

| | | |
|---|---|---|
| 3,676,150 A | 7/1972 | Glicksman et al. |
| 4,451,490 A | 5/1984 | Silverman et al. |

FOREIGN PATENT DOCUMENTS

| | | |
|---|---|---|
| FR | 2 765 076 | 12/1998 |
| JP | 2003-169593 | 6/2003 |
| JP | 2003-304801 | 10/2003 |

OTHER PUBLICATIONS

Anwarul Haque et al., Polysaccharide substitutes for gluten in non-wheat bread, Carbohydrate Polymers 25, (1994) pp. 337-344.
Nishita K.S. et al. "Development of a Yeast-Leavened Rice-Bread Formula" Cereal Chemistry, American Association of Cereal Chemists, US, vol. 53. No. 5, 1976, pp. 626-635, XP000889633.
Anonymous: "Methylcellulose in Low Gluten Bread", Research Disclosure, Kenneth Mason Publications, Westbourne, GB, vol. 259, No. 23, Nov. 1985, XP007110240.
Yltmaki G. et al. "Application of Response Surface Methodology to the Development of Rice Flour Yeast Breads: Objective Measurements", Journal of Food Science, Institute of Food Technologists, Chicago, US, vol. 53, No. 6, Nov. 1988, pp. 1800-1805, XP002061425.
Haque A. et al. "Polysaccharide Substitutes for Gluten in Non-Wheat Bread", Carbohydrate Polymers, vol. 25; No. 4, 1994, pp. 337-344, XP002331479.

*Primary Examiner* — Lien Tran
(74) *Attorney, Agent, or Firm* — Westerman, Hattori, Daniels & Adrian, LLP

(57) ABSTRACT

A dough composition comprising gluten-free cereal flour, a water-soluble cellulose ether, and a low substituted cellulose ether having a molar substitution of 0.05-1.0 is provided. The bread made from the dough composition has a good mouthfeel and a satisfactory volume, retains softness over time, and are eatable by those patients of food allergy to wheat or the like.

4 Claims, No Drawings

DOUGH COMPOSITIONS

CROSS-REFERENCE TO RELATED APPLICATION

This non-provisional application claims priority under 35 U.S.C. §119(a) on Patent Application No. 2004-032233 filed in Japan on Feb. 9, 2004, the entire contents of which are hereby incorporated by reference.

TECHNICAL FIELD

This invention relates to dough compositions suitable for producing bread and similar products that even patients suffering from food allergy to wheat or the like can eat.

BACKGROUND ART

The number of allergic patients to a variety of allergens is rapidly increasing in these days. This is attributed to the large consumption of protein due to the modernization of eating habit and complex combinations of various other factors that cause numerous substances existing in the living environment to convert to allergens.

A rapid increase of food allergy to wheat and other cereals is also noteworthy. In order to avoid food allergy, it is attempted to restrict or prohibit the ingestion of the relevant food item. In the case of processed foods serving as the staple diet like bread, however, it is difficult to restrict or prohibit ingestion.

In general, it is very difficult to make bread using gluten-free cereal flours such as rice flour and buckwheat flour. When dough is fermented with yeast, in the case of dough using wheat flour or rye flour containing gluten (i.e., protein consisting of chemically combined gliadin and glutenin), the carbon dioxide gas generated by fermentation is retained by the gluten so that the gluten network is extended and the dough rises. In the case of dough using gluten-free cereal flour, the carbon dioxide gas generated by fermentation is not retained within the dough so that the dough does not efficiently rise.

Then one approach of making bread using gluten-free cereal flour is by adding gluten extracted from wheat flour to the gluten-free cereal flour so that the bread becomes voluminous, as described in JP-A 2003-304801. Regrettably, wheat allergic patients cannot eat this bread because the gluten added contains a protein acting as an allergen.

It is also known from JP-A 2003-169593 to make bread using the gluten or wheat flour from which the protein acting as an allergen has been removed by a special treatment. Since it is unlikely that the protein acting as an allergen is removed in its entirety, those patients having strong allergic response cannot eat.

For making bread for allergic patients without using wheat flour or gluten extracted therefrom, the use of water-soluble cellulose ether and isagol (or psyllium) so as to render the bread voluminous is known from Carbohydr. Poly., 25, 337 (1994). It is also known to add water-soluble polysaccharides such as guar gum and xanthane gum for the same purpose.

The bread made using isagol or water-soluble polysaccharides has a certain volume, but a hard crust, giving a disrelish to the mouth. When water-soluble polysaccharides are added, the crumb is elastic enough to give a rubber-like mouthfeel. When food fibers like isagol are added, the crumb is very tender and non-elastic, giving a mouthfeel far different than bread. Due to poor moisture retention, the bread becomes dry and crumbly with the lapse of time from baking, suddenly losing a mouthfeel.

For isagol, there are allergic crises and sufficient data to insure safety have not been reported. Thus, there is a need for substitute additives for isagol.

On the other hand, for the purposes of expanding the consumption of rice, increasing the domestic food supply and solving the future short-of-provisions issue, it has been sought to establish a method of making bread using rice flour. It is believed that the bread made of cereal flour other than wheat flour (e.g., bread made of rice flour) gives a unique, gently moist, smooth-to-the-throat mouthfeel different than the traditional bread and will appeal to the people other than the wheat allergic patients. There exists a demand for a method of making bread using gluten-free cereal flour such as rice flour.

SUMMARY OF THE INVENTION

An object of the present invention is to provide a dough composition comprising gluten-free cereal flour, capable of making bread and food products that have a satisfactory volume and mouthfeel and are eatable even by wheat and similar food allergic patients.

The inventors have found that when a water-soluble cellulose ether and a low substituted cellulose ether having an improved water-swelling ability are added to gluten-free cereal flour, there is obtained a dough composition from which bread and food products can be made. The bread has a satisfactory volume and a good mouthfeel and can be eaten even by those patients suffering from food allergy to wheat or the like.

The present invention provides a dough composition comprising gluten-free cereal flour, a water-soluble cellulose ether, and a low substituted cellulose ether having a molar substitution of 0.05 to 1.0.

Preferably, the water-soluble cellulose ether is an alkyl cellulose or hydroxyalkyl alkyl cellulose. Also preferably, the low substituted cellulose having a molar substitution of 0.05 to 1.0 is a low substituted alkyl cellulose or hydroxyalkyl alkyl cellulose, and in particulate form having an average particle size of up to 100 μm.

Despite the sole use of gluten-free cereal flour, the bread made from the dough composition of the invention does not buckle, gives a good mouthfeel and a volume comparable to ordinary bread baked using wheat flour, and retains its softness developed immediately after baking over time, and are eatable by those patients suffering from food allergy to wheat or the like.

DESCRIPTION OF THE PREFERRED EMBODIMENTS

Examples of suitable gluten-free cereal flour used herein include rice flour, buckwheat flour, starch, millet flour, amaranth flour, and potato flour, which are used alone or in admixture. Edible salt, sugar, oils, fats, emulsifiers, flavors and the like may be added if desired.

It is believed that the water-soluble cellulose ether used herein becomes gel upon heating, exhibiting a good moisture-retaining ability. It is also believed to exhibit a good moisture-retaining ability even at temperatures not so high as to cause thermal gelation. Examples of suitable water-soluble cellulose ether include alkyl celluloses such as methyl cellulose, and hydroxyalkyl alkyl celluloses such as hydroxypropyl methyl cellulose, hydroxyethyl methyl cellulose and hydroxyethyl ethyl cellulose. Preferred are methyl cellulose (MC) containing 10 to 40% by weight of methoxy groups, hydroxypropyl methyl cellulose (HPMC) or hydroxyethyl methyl cellulose (HEMC) containing 10 to 40% by weight of methoxyl groups and 3 to 30% by weight of hydroxyalkyl groups, and hydroxyethyl ethyl cellulose (HEEC) containing 5 to 20% by weight of ethoxyl groups and 10 to 45% by weight of hydroxyethyl groups.

The water-soluble cellulose ether has a weight average molecular weight (Mw) which is not critical, but is preferably at least 1,000 g/mol, and more preferably 10,000 to 1,000,000 g/mol, as measured by an analysis using the GPC-MALLS system (Showa Denko K.K.) in which gel permeation chromatography (GPC) is combined with a multi-angle laser light scattering (MALLS) detector.

The water-soluble cellulose ether is obtainable by starting with a cellulosic material derived from wood meal, coconut shell flour, walnut shell flour or linter, a fine cellulose resulting from depolymerization thereof by acidic hydrolysis, alkaline hydrolysis, enzymatic decomposition or explosive treatment, or a fine cellulose resulting from mechanical processing thereof, adding an alkaline component such as sodium hydroxide thereto, and further adding an etherifying agent such as methyl chloride, ethyl chloride, propylene oxide or ethylene oxide for reaction, followed by hot water washing, drying and grinding.

An appropriate amount of water-soluble cellulose ether added is 0.1 to 5.0 parts by weight, more preferably 0.5 to 3.0 parts by weight per 100 parts by weight of the gluten-free cereal flour. Less than 0.1 part of water-soluble cellulose ether may be too small to provide the addition effect. More than 5.0 parts may render the dough composition less extensible and require an excessive amount of water which will obstruct the desirable mouthfeel, resulting in a hard mouthfeel.

According to the invention, a low substituted cellulose ether having an improved water-swelling ability is added to further improve the moisture retention of the dough composition and baked products thereof.

The low substituted cellulose ether has the nature that it is not dissolved in water, but in alkaline solution. In general, cellulose is water insoluble. When hydrogen atoms of hydroxyl groups on glucose rings constituting cellulose are substituted with alkyl or hydroxyalkyl groups, the cellulose turns to have some water solubility depending on the degree of substitution. However, many low substituted cellulose derivatives appear to be insoluble in water, and instead, to have solubility in alkaline solution. In many cases, low substituted cellulose ether powder becomes partially swollen when dispersed in water. As the molar substitution increases, cellulose ethers become water soluble, and instead, lose solubility in alkali.

The low substituted cellulose ether used herein should have a molar substitution of 0.05 to 1.0. Specific examples include a low substituted methyl cellulose having a molar substitution of 0.16 to 0.85 with methoxyl groups, a low substituted hydroxyethyl cellulose having a molar substitution of 0.08 to 0.45 with hydroxyethoxyl groups, a low substituted hydroxypropyl cellulose having a molar substitution of 0.091 to 0.51 with hydroxypropoxyl groups, and a low substituted hydroxypropyl methyl cellulose having a total molar substitution of 0.25 to 1.0 with methoxyl and hydroxypropoxyl groups, with the low substituted hydroxypropyl cellulose being preferred.

Also the low substituted cellulose ether should preferably have an average particle size of up to 100 μm, and more preferably up to 50 μm, as measured by a laser diffraction type particle size distribution analyzer HELOS SYSTEM (Nippon Laser Corp.). A smaller average particle size provides better swell in water and a larger volume of bread after baking. The lower limit of average particle size is usually at least 1 μm, preferably at least 10 μm, though not critical.

The low substituted cellulose ether may be comminuted either by wet milling or by dry milling. The thus comminuted cellulose ether may be dried into a powder form, for example, by spray drying before it is added to the dough. Alternatively, the solution form of cellulose ether as wet milled may be added directly to the dough.

An appropriate amount of low substituted cellulose ether added is 0.1 to 5.0 parts by weight, more preferably 0.1 to 2.0 parts by weight per 100 parts by weight of the gluten-free cereal flour. Less than 0.1 part of low substituted cellulose ether may be too small to provide the addition effect. More than 5.0 parts may render the dough composition less extensible and require an excessive amount of water which will obstruct the desirable mouthfeel, resulting in a hard mouthfeel.

It is noted that the water-soluble cellulose ether and the low substituted cellulose ether are preferably combined such that 10 to 200 parts by weight, especially 40 to 60 parts by weight of the low substituted cellulose ether is present per 100 parts by weight of the water-soluble cellulose ether. Outside the range, the dough composition may lose a balance of rise and moisture retention, failing to make a volume of bread when baked.

An appropriate amount of water added to the dough composition of the invention is 60 to 120 parts by weight, more preferably 90 to 110 parts by weight per 100 parts by weight of the gluten-free cereal flour. The dough composition with less than 60 parts of water may be hard, resulting in inefficient leavening of bread when baked. The dough composition with more than 120 parts of water results in excessive leavening of bread when baked, which bread will buckle, contain large holes, and be poor in both appearance and mouthfeel.

It is understood that gluten-free bread can be made by a conventional process, that is, by mixing cereal flour, yeast, water, water-soluble cellulose ether, low substituted cellulose ether, common salt, sugar, oil and fat, and optionally, an emulsifier and flavors, kneading the mix to form a dough, allowing the dough to ferment or rise, shaping the dough or placing the dough in a mold, and baking.

The raw materials used herein including cereal flour, salt, sugar, oil and fat may be commercially available materials. Specifically for food allergic patients, raw materials guaranteed against allergy should be used.

EXAMPLE

Examples and Comparative Examples are given below for further illustrating the invention although the invention is not limited thereto. In Examples, all parts are by weight. The weight average molecular weight (Mw) is measured by an analysis using the GPC-MALLS system (Showa Denko K.K.) in which gel permeation chromatography (GPC) is combined with a multi-angle laser light scattering (MALLS) detector. The average particle size is measured by a laser diffraction type particle size distribution analyzer HELOS SYSTEM (Nippon Laser Corp.).

Example 1

A dough composition was prepared by combining 100 parts of non-glutenous rice flour, 100 parts of cornstarch, 4 parts of salt, 20 parts of sugar, 6 parts of instant dry yeast, 20 parts of shortening, 2 parts of methyl cellulose (by Shin-Etsu Chemical Co., Ltd., Mw 292,000 g/mol, molar substitution 1.8), 1 part of low substituted hydroxypropyl cellulose (by Shin-Etsu Chemical Co., Ltd., Mw 119,000 g/mol, molar substitution 0.25, average particle size 40 μm), and 190 parts of water and kneading the ingredients until the composition became uniform. The dough composition was held at 28° C. for 20 minutes for rising. The risen dough composition was deflated, shaped and placed in a mold where the dough was let to rise for a further 20 minutes. The dough composition was then baked at 210° C. for about 20 minutes, obtaining a loaf of bread.

Example 2

One part of low substituted hydroxypropyl cellulose (by Shin-Etsu Chemical Co., Ltd., Mw 119,000 g/mol, molar substitution 0.25, average particle size 40 μm) was dispersed in 190 parts of water. The dispersion was wet milled on a ultra-fine grinder Cerendipitor MKCA 6-3. (Masuko Sangyo Co., Ltd.) until an average particle size of 10 μm was reached.

A dough composition was prepared by combining 100 parts of non-glutenous rice flour, 100 parts of cornstarch, 4 parts of salt, 20 parts of sugar, 6 parts of instant dry yeast, 20 parts of shortening, 2 parts of hydroxypropyl methyl cellulose (by Shin-Etsu Chemical Co., Ltd., Mw 292,000 g/mol, methoxyl molar substitution 1.4, hydroxypropoxyl molar substitution 0.2), and 191 parts of the wet milled low substituted hydroxypropyl cellulose dispersion and kneading the ingredients until the composition became uniform. The dough composition was then processed as in Example 1, making a loaf of bread.

Comparative Example 1

A dough composition was prepared by combining 200 parts of wheat flour, 4 parts of salt, 20 parts of sugar, 6 parts of instant dry yeast, 20 parts of shortening, and 130 parts of water, and kneading the ingredients until the composition became uniform. The dough composition was then processed as in Example 1, making a loaf of bread.

Comparative Example 2

A dough composition was prepared by combining 100 parts of non-glutenous rice flour, 100 parts of corn starch, 4 parts of salt, 20 parts of sugar, 6 parts of instant dry yeast, 20 parts of shortening, and 190 parts of water, and kneading the ingredients until the composition became uniform. The dough composition was then processed as in Example 1, making a loaf of bread.

Comparative Example 3

A dough composition was prepared by combining 100 parts of non-glutenous rice flour, 100 parts of cornstarch, 2 parts of methyl cellulose (by Shin-Etsu Chemical Co., Ltd., Mw 292,000 g/mol, molar substitution 1.8), 4 parts of salt, 20 parts of sugar, 6 parts of instant dry yeast, 26 parts of shortening, and 190 parts of water, and kneading the ingredients until the composition became uniform. The dough composition was then processed as in Example 1, making a loaf of bread.

The loaves of bread obtained in Examples and Comparative Examples were examined for the volume of bread after 2 hours from baking and visually observed to inspect buckling. Using a rheometer, the softness of the crumb and crust was measured after 2 hours and 24 hours from baking. The unit is a hardness stress (g) which represents the pressure applied to a circular disk having a diameter of 2 cm for the crumb and the pressure applied to a needle having a diameter of 2 mm for the crust. A higher hardness stress indicates a harder crumb. The results are summarized in Table 1.

The loaves of bread after 2 hours from baking were subjected to a panel test with respect to chewy texture, mouth melt, and mouthfeel. The results are shown in Table 2.

TABLE 1

| | 2 hr from baking | Hardness after 2 hr from baking | | Hardness after 24 hr from baking | |
| --- | --- | --- | --- | --- | --- |
| | Volume (ml) | Crumb (g) | Crust (g) | Crumb (g) | Crust (g) |
| Example 1 | 1130 | 142 | 122 | 311 | 55 |
| Example 2 | 1200 | 135 | 117 | 286 | 50 |
| Comparative Example 1 | 1250 | 126 | 38 | 379 | 18 |
| Comparative Example 2 | 1350 | 80 | 212 | 732 | 35 |
| Comparative Example 3 | 1090 | 312 | 63 | 478 | 84 |

TABLE 2

| | Chewy texture | Mouth melt | Mouthfeel |
| --- | --- | --- | --- |
| Example 1 | moderate | good | Both crumb and crust are soft, comparable to ordinary bread. Good chewy consistency. Good taste. |
| Example 2 | moderate | good | Due to uniformly distributed many holes, both crumb and crust are soft, comparable to ordinary bread. Good chewy texture. Good taste. |
| Comparative Example 1 | soft | good | Least chewy texture, but good mouth melt. |
| Comparative Example 2 | firm | poor | Crumb is moist, giving too much chewy consistency. Bad mouthfeel. |
| Comparative Example 3 | moderate | good | (Both crumb and crust become hard after 24 hours.) |

Japanese Patent Application No. 2004-032233 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A dough composition comprising 100 parts by weight of gluten-free cereal flour or potato flour, 0.1 to 5.0 parts by weight of a water-soluble cellulose ether, 0.1 to 5.0 parts by weight of a low substituted cellulose ether which is not dissolvable in water but dissolvable in alkaline solution, and is selected from at least one of the group consisting of: a low substituted methyl cellulose having a molar substitution of 0.16 to 0.85 with methoxyl groups, a low substituted hydroxyethyl cellulose having a molar substitution of 0.08 to 0.45 with hydroxyethoxyl groups, a low substituted hydroxypropyl cellulose having a molar substitution of 0.091 to 0.51 with hydroxypropoxyl groups, and a low substituted hydroxypropyl methyl cellulose having a total molar substitution of 0.25 to 1.0 with methoxyl and hydroxypropoxyl groups, and 60 to 120 parts by weight of water,
wherein the water-soluble cellulose ether and the low substituted cellulose ether are combined such that 10 to 200 parts by weight of the low substituted cellulose ether is present per 100 parts by weight of the water-soluble cellulose ether.

2. The dough composition of claim 1, wherein the water-soluble cellulose ether is an alkyl cellulose or hydroxyalkyl alkyl cellulose.

3. The dough composition of claim 1, wherein the low substituted cellulose ether having a molar substitution of 0.05 to 1.0 has an average particle size of up to 100 μm.

4. The dough composition of claim 1, wherein the gluten-free cereal flour is at least one flour selected from the group consisting of rice flour, buckwheat flour, starch, millet flour and amaranth flour.

* * * * *